United States Patent [19]

Collmann

[11] 3,853,165
[45] Dec. 10, 1974

[54] TIRE REMOVAL APPARATUS

[76] Inventor: Wilhelm Collmann, Moislinger Allee 224, 24 Lubeck, Germany

[22] Filed: Apr. 10, 1974

[21] Appl. No.: 459,662

[52] U.S. Cl. .............................................. 157/1.2
[51] Int. Cl. .......................................... B60c 25/08
[58] Field of Search .......... 157/1.17, 1.2, 1.24, 1.26

[56] References Cited
UNITED STATES PATENTS

| | | | |
|---|---|---|---|
| 2,362,061 | 11/1944 | Ewing | 157/1.2 |
| 2,692,013 | 10/1954 | Duquesne | 157/1.2 |

*Primary Examiner*—Al Lawrence Smith
*Assistant Examiner*—Harold P. Smith, Jr.

[57] ABSTRACT

This invention relates to apparatus for removing tires, particularly heavy duty tires as used on goods vehicles, from circumferentially-separated rims, said apparatus being of the kind in which two pressure arms fitted with shoes arranged to apply pressure to the tire for pressing it off the wheel rim when the latter is resting on a rim support, are hinged in mutually-opposed positions to an upper cross beam. According to the invention, an upright pillar comprising upper and lower parts is arranged on a pedestal plate, the upper part of said pillar being attached to the centre of the cross beam between said pressure arms and said rim support being mounted on the lower part of said pillar so as to be axially displaceable thereon. A bellows expandable in the direction in which the said rim support moves by supplying compressed air to said bellows is attached to said rim support and also to said pedestal plate.

6 Claims, 2 Drawing Figures

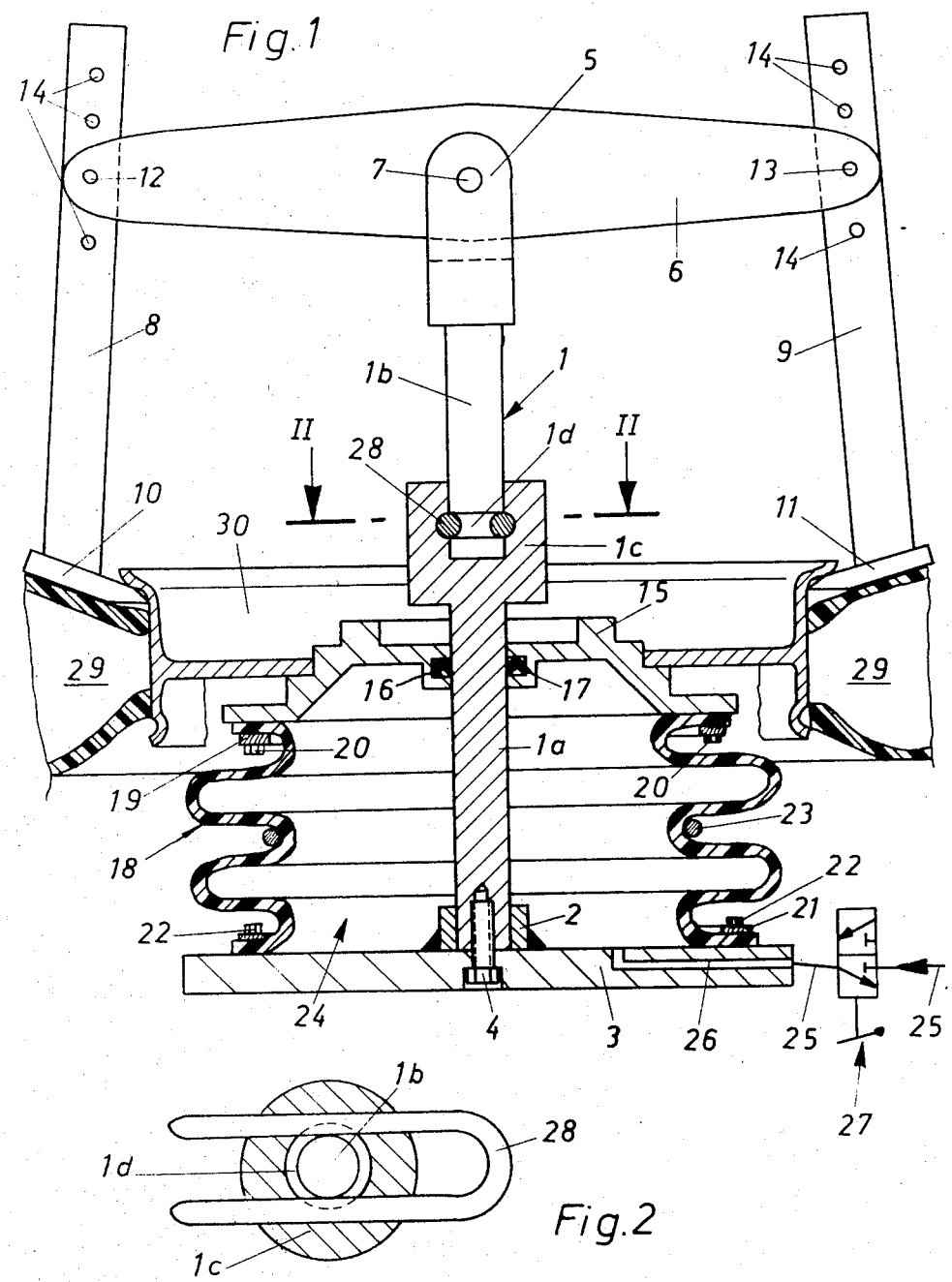

TIRE REMOVAL APPARATUS

BACKGROUND OF THE INVENTION

The present invention relates to apparatus for removing tires, particularly heavy-duty tires as used on goods vehicles, from circumferentially-separated rims, said apparatus being of the kind in which two pressure arms fitted with shoes arranged to apply pressure to the tire for pressing it off the wheel rim when the latter is resting on a rim support, are hinged in mutually-opposed positions to an upper cross beam. Hereinafter such apparatus will be referred to as "apparatus of the kind described."

Apparatus of the kind described is already known which consists of an upright square frame made up from an upper and a lower cross-bar and lateral struts connecting the cross-bars together. A power cylinder is attached to the bottom of the lower cross-bar and its piston passes through the bar and projects into the interior of the frame. This projecting end is provided with a stepped rim-support to hold rims of different sizes.

The disadvantage of this known apparatus is that, because it is so intensively used, it needs to be very strongly built and be of relatively large dimensions, which makes it expensive to manufacture. It is therefore uneconomical to buy an apparatus of this type when the necessity to remove heavy duty tires from circumferentially-separated rims very seldom arises, as it does for example in a small repair shop. Furthermore, considerable force is required to remove tires of this type and with conventional manual appliances this can only be exerted with considerable physical effort. A further disadvantage is that the known apparatus requires a relatively large amount of maintenance since the cylinder is hydraulically operated and therefore the oil seals normally employed thereon have to be renewed from time to time. Furthermore, its relatively large dimensions means that it takes up a corresponding amount of space and at the same time it is necessary to provide a pit or the like in the surface on which it stands, to accommodate the downwardly projecting cylinder.

It is an object of the invention to overcome or minimize these and other disadvantages by providing an apparatus of the kind described, which is inexpensive to manufacture and is of compact construction and allows relatively high forces to be applied in a simple fashion for tire removal.

SUMMARY OF THE INVENTION

This object is achieved by providing a vertical central pillar which is in separate parts and is arranged on a pedestal and the top of which is secured between the pressure arms to the centre of a cross-beam, and on the lower section of which the rim support is mounted so as to be axially displaceable, and by securing to the rim support and the pedestal a bellows which can be expanded in the direction in which the rim support moves by supplying compressed air to it.

Advantageously the upper section of the pillar may be positively but detachably and rotatably mounted in the lower section of the pillar. In addition the cross-beam is so connected to the central pillar that it can move about a horizontal axis.

The arrangement according to the invention renders the apparatus inexpensive to manufacture and of compact construction and enables relatively great forces to be applied in a simple way in order to remove the tire from their circumferentially-separated rims. The apparatus is therefore particularly economical for fairly small businesses in which it does not often occur that heavy duty tires have to be fitted to or removed from circumferentially-separated rims. In addition, the apparatus according to the invention requires little room for transportation or installation since it is not very tall and since the top part of the apparatus which combines the cross-beam and the pressure arms can be removed. Furthermore, transportation is made easier by the relatively low weight of the apparatus. Its simple construction and the use of a bellows operated by compressed air mean that the apparatus requires little maintenance. The bellows has the further advantage that it allows the rim support to have a relatively large travel since it can be extended a long way from its collapsed state. Its use is also one of the main reasons for the modest height of the apparatus. It should also be mentioned that the apparatus according to the invention can be set up on any surface without the surface needing to be prepared for it, as is normally necessary when special foundations are provided.

DESCRIPTION OF THE DRAWINGS

In order that the invention may be more clearly understood, reference will now be made to the accompanying drawings which show one embodiment thereof by way of example and in which:

FIG. 1 shows the removing apparatus according to the invention which is shown mainly in axial section, FIG. 2 shows a cross-section along line II—II of FIG. 1 to an enlarged scale and at an angle of 90° to the plane of FIG. 1.

DESCRIPTION OF THE PREFERRED EMBODIMENT

Referring now to the drawings, as shown in FIG. 1, the apparatus according to the invention for removing lorry tires from circumferentially-separated rims has an upright pillar 1. The bottom of the pillar is engaged in a sleeve-like seating 2 which is welded to a plate-like pedestal 3 and the pillar is rigidly connected to the pedestal by means of a bolt 4. In the forked upper end 5 of pillar 1 is mounted a straight cross-beam 6 which is pivoted about a horizontal axis by means of a bolt 7 and to the free ends of which, pressure arms 8 and 9 fitted with pressure shoes 10 and 11 are hinged by means of cotter pins 12 and 13. The pressure arms are provided with a number of holes 14 so that they may be set at various levels in their longitudinal direction on the cross-beam. It is also possible for the ends of the cross-beam to be forked to provide better guidance and support for the pressure arms. A circular bored stepped rim support 15 is mounted in an axially displaceable manner on the lower section 1a of the pillar 1, and in the wall of the bore through the centre of the rim support is provided an annular recess 16 for a sealing ring 17. Between rim support 15 and pedestal 2 is provided a flexible bellows 18 which is coaxial with pillar 1 and is preferably made of rubber material reinforced with fabric inserts. The bellows is fastened on the one hand to the bottom of the outer edge of the rim support by means of a clamping ring 19 and bolts 20 and on the other hand to the pedestal 3 by means of a further clamping ring 21 and bolts 22. For safety reasons a further strengthening ring 23 is fitted around the bellows. An enclosed space 24 is thus formed by the rim support, the bellows and the pedestal and into this space compressed air is fed via a supply line 24 and an air passage 26 in pedestal 2 so that the rim support 15 will rise as the bellows 18 expands axially. Supply and release of compressed air is controlled by means of a hand or foot-operated valve 27.

The pillar 1 is divided into separate parts, namely an upper section 1b, and the lower section 1a which has already been mentioned. The upper section 1b is supported in a seating portion 1c on the lower section 1a and has an annular groove 1d which co-operates with a U-shaped clip 28, the clip 28 being inserted through bores in the seating portion 1c. In this way the top part of the apparatus is mounted so as to be rotatable in the lower part of the apparatus about the longitudinal axis of the pillar in order to allow the pressure arms 8, 9 to be applied at different points on the tire 29. It can also be seen that it is easily possible for the top of the apparatus to be removed from the bottom part, which needs to be done to carry out the tire-removing operations described below. The separable nature of the parts of the apparatus mentioned has the further advantage that the apparatus is made easier to transport.

If a tire 29 is to be removed from its rim 30 then, after the top part of the apparatus has first been removed, the rim and tire are placed on the rim support 15, although the other way up from the position shown in FIG. 1. The top part of the apparatus is then replaced and is locked positively in place by means of clip 28. Compressed air is then fed into space 24, as a result of which the bellows 18 expands axially and thus raises the rim support and the rim resting on it and its tire. When this happens the pressure arms 8 and 9 abut against the sidewalls of the tire and hold it stationary while the rim continues to be raised, as a result of which the upper bead of the tire is relatively moved away from its rim. If necessary, the rim may then be lowered a little and turned so that the pressure arms may be applied to another point of the tire. It is now easily possible to remove the known spring retainer-rings (not shown) from the circumferentially-separable rim 30. The rim support 15 is then lowered, the upper part of the apparatus again removed and the tire and rim turnedover, after which the process described is repeated so that the tire 29 can be pressed off the rim 30 as shown in FIG. 1.

I claim:

1. In apparatus for removing tires from circumferentially-separable rims, of the kind in which pressure arms, fitted with shoes to apply pressure to the tire to press the tire off the rim when the latter is resting on a rim support, are hinged in mutually opposed positions to an upper cross-beam, the invention which comprises an upright central pillar including upper and lower parts and which is arranged on a pedestal plate, the upper part of said pillar being attached to the center of the cross-beam between said pressure arms and said rim support being mounted on the lower part of said pillar so as to be axially displaceable thereon, and a bellows attached to said rim and said pedestal plate and expandable in a direction to move said rim support toward said shoes by supplying compressed air to said bellows.

2. Apparatus according to claim 1, wherein the upper part of said pillar is positively but deetachably and rotatably mounted in the lower part of said pillar.

3. Apparatus according to claim 1, wherein said cross-beam is connected to said upper part of said pillar so as to be movable about a horizontal axis.

4. Apparatus according to claim 2, wherein said cross-beam is connected to said upper part of said pillar so as to be movable about a horizontal axis.

5. Apparatus for removing a tire from a wheel rim comprising a pedestal plate, a pillar secured to the centre of said pedestal plate, said pillar comprising upper and lower parts, a cross-beam pivotally linked to the top of said upper pillar part, a pressure arm pivotally linked to each end of said cross-beam, a pressure shoe fitted to the lower end of each of said pressure arms, a wheel rim support mounted on said lower pillar part to be axially displaceable thereon, a bellows member interconnecting said pedestal plate and said rim support to define an expandable chamber, means for admitting air under pressure to said expandable chamber, and air seal means between said bellows and said lower part of said pillar.

6. Apparatus according to claim 5 wherein said upper and lower pillar parts are relatively rotatable and securable together by a fastening clip.

* * * * *